(12) United States Patent
Kogai et al.

(10) Patent No.: US 10,435,777 B2
(45) Date of Patent: Oct. 8, 2019

(54) INNER SURFACE-MODIFIED TUBE, INNER SURFACE-MODIFIED TUBE MANUFACTURING METHOD, AND INNER SURFACE-MODIFIED TUBE MANUFACTURING DEVICE

(71) Applicant: SofSera Corporation, Tokyo (JP)

(72) Inventors: Yasumichi Kogai, Tokyo (JP); Karl Kazushige Kawabe, Tokyo (JP)

(73) Assignee: SofSera Corporation, Tokyo (JP)

( * ) Notice: Subject to any disclaimer, the term of this patent is extended or adjusted under 35 U.S.C. 154(b) by 240 days.

(21) Appl. No.: 15/119,451

(22) PCT Filed: Feb. 17, 2015

(86) PCT No.: PCT/JP2015/054326
§ 371 (c)(1),
(2) Date: Aug. 17, 2016

(87) PCT Pub. No.: WO2015/125789
PCT Pub. Date: Aug. 27, 2015

(65) Prior Publication Data
US 2017/0009327 A1    Jan. 12, 2017

(30) Foreign Application Priority Data
Feb. 18, 2014 (JP) ................. 2014-028309

(51) Int. Cl.
*B05B 7/14* (2006.01)
*B05D 1/12* (2006.01)
(Continued)

(52) U.S. Cl.
CPC ............ *C23C 4/11* (2016.01); *B05B 7/1481* (2013.01); *B05D 1/12* (2013.01); *B29C 48/30* (2019.02);
(Continued)

(58) Field of Classification Search
CPC ......... B01L 3/14; B05D 2254/04; B05D 1/12; C23C 4/11; B05B 7/1481; B29C 47/20; B21C 23/22
(Continued)

(56) References Cited

U.S. PATENT DOCUMENTS

| | | | | |
|---|---|---|---|---|
| 5,104,702 A | * | 4/1992 | Ohachi | C08L 27/06 422/555 |
| 5,326,535 A | * | 7/1994 | Vogler | B01L 3/5082 422/550 |
| 2008/0274671 A1 | * | 11/2008 | O'Donoghue | A61F 2/30767 451/39 |

FOREIGN PATENT DOCUMENTS

| | | |
|---|---|---|
| CN | 101230946 A | 7/2008 |
| EP | 0766973 A1 | 4/1997 |

(Continued)

OTHER PUBLICATIONS

International Search Report issued in corresponding application No. PCT/JP2015/054326 dated May 12, 2015 (4 pages).
(Continued)

*Primary Examiner* — Lee E Sanderson
*Assistant Examiner* — Michael C Romanowski
(74) *Attorney, Agent, or Firm* — Osha Liang LLP

(57) ABSTRACT

An inner surface-modified tube includes fine particles that are buried in an inner surface of a tube with part of surfaces of the fine particles exposed, wherein the fine particles are unevenly distributed such that more fine particles are distributed in a region from a center of the tube to the inner surface of the tube than in a region from the center of the tube to an outer surface of the tube based on a thickness direction of the tube, an arithmetic average roughness Ra of the inner surface of the tube is 1 nm or more and 100 μm or less, a particle diameter of each fine particle is 10 nm or
(Continued)

more and 100 μm or less, and an inner diameter of the tube is 0.01 mm or more and 100 mm or less.

11 Claims, 8 Drawing Sheets

(51) Int. Cl.
    *B29C 48/32*     (2019.01)
    *C23C 4/11*     (2016.01)
    *F16L 58/04*     (2006.01)
    *B29C 48/30*     (2019.01)
    *C23C 24/02*     (2006.01)
    *B29L 23/00*     (2006.01)

(52) U.S. Cl.
    CPC .............. *B29C 48/32* (2019.02); *C23C 24/02* (2013.01); *F16L 58/04* (2013.01); *B05D 2254/04* (2013.01); *B29L 2023/22* (2013.01)

(58) Field of Classification Search
    USPC ........................................ 422/102; 427/2.27
    See application file for complete search history.

(56) References Cited

FOREIGN PATENT DOCUMENTS

| GB | 2337367 A | 11/1999 |
|---|---|---|
| JP | S61172278 U | 10/1986 |
| JP | S6263679 A | 3/1987 |
| JP | H03186695 A | 8/1991 |
| JP | H06117581 A | 4/1994 |
| JP | 7000378 A | 1/1995 |
| JP | H0960768 A | 3/1997 |
| JP | H09173321 A | 7/1997 |
| JP | H09317984 A | 12/1997 |
| JP | 2001521604 A | 11/2001 |
| JP | 2005207565 A | 8/2005 |
| JP | 2008215618 A | 9/2008 |
| JP | 2013096797 A | 5/2013 |
| KR | 1020080070304 A | 7/2008 |
| WO | 1998042052 A1 | 9/1998 |

OTHER PUBLICATIONS

Written Opinion of the International Searching Authority issued in corresponding application No. PCT/JP2015/054326 dated May 12, 2015 (4 pages).

Office Action dated Dec. 4, 2017, issued by The State Intellectual Property Office of The Peoples Republic of China in corresponding Chinese Patent Application No. 201580007958.6, with English machine-translation (17 pages).

Extended European Search Report issued in European Application No. 15751557.8; dated Sep. 7, 2017 (9 pages).

International Preliminary Report on Patentability issued in corresponding International application No. PCT/JP2015/054326 dated Sep. 1, 2016 (8 pages).

Office Action issued in Chinese Application No. 201580007958.6; dated Dec. 4, 2017 (17 pages).

* cited by examiner

[FIG. 1]
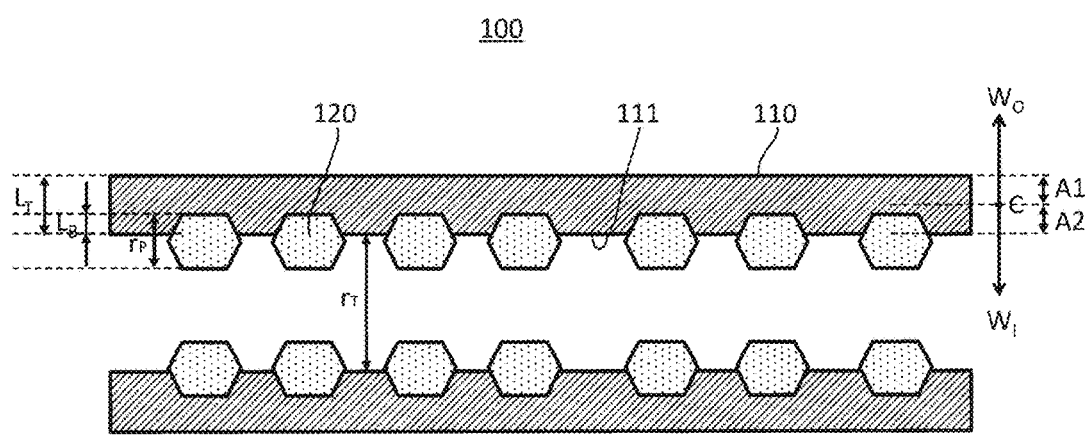

[FIG. 2A]
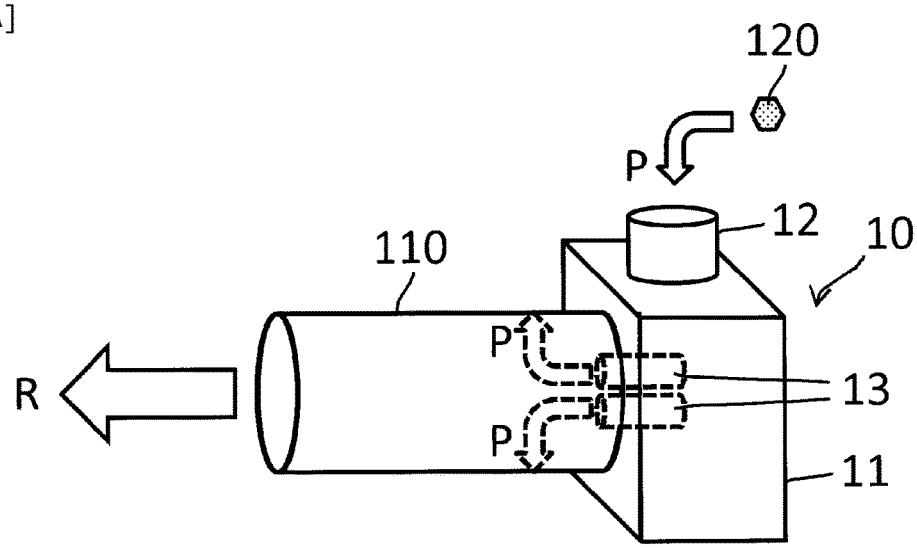
[FIG. 2B]
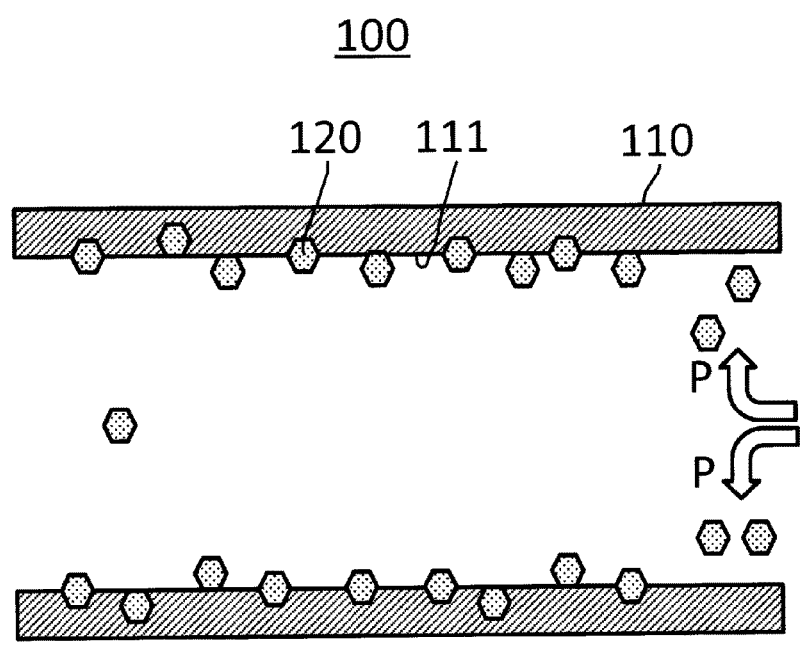

[FIG. 3]
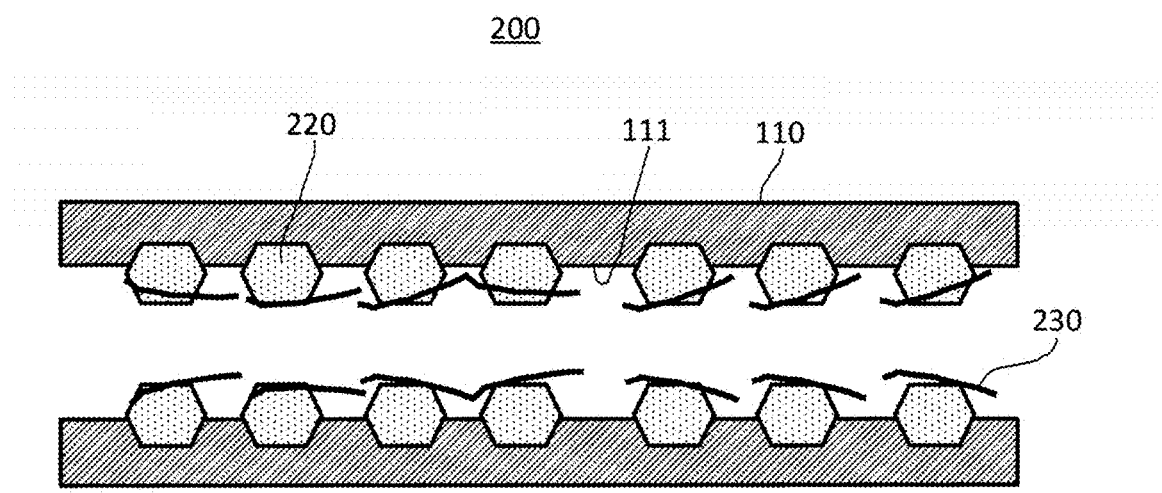

[FIG. 4A]
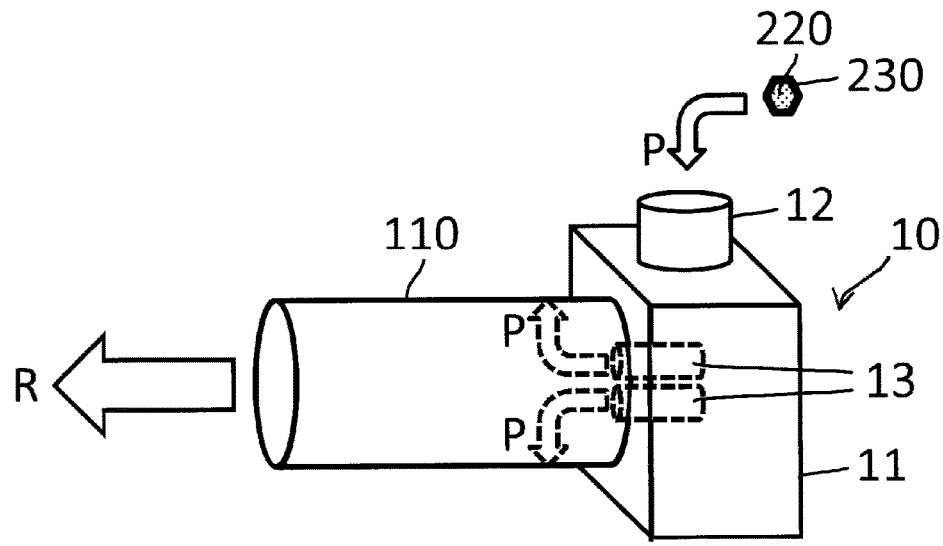
[FIG. 4B]
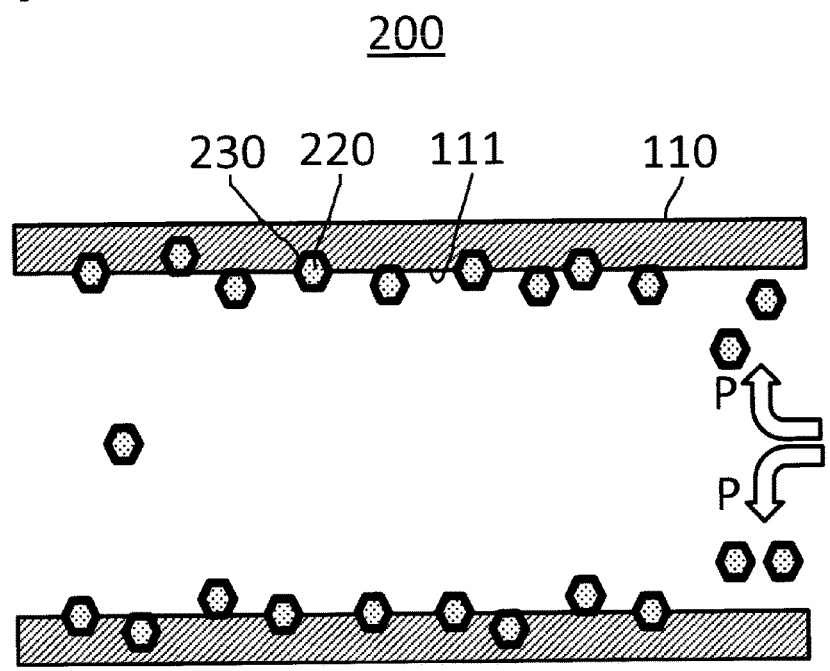

[FIG. 5A]
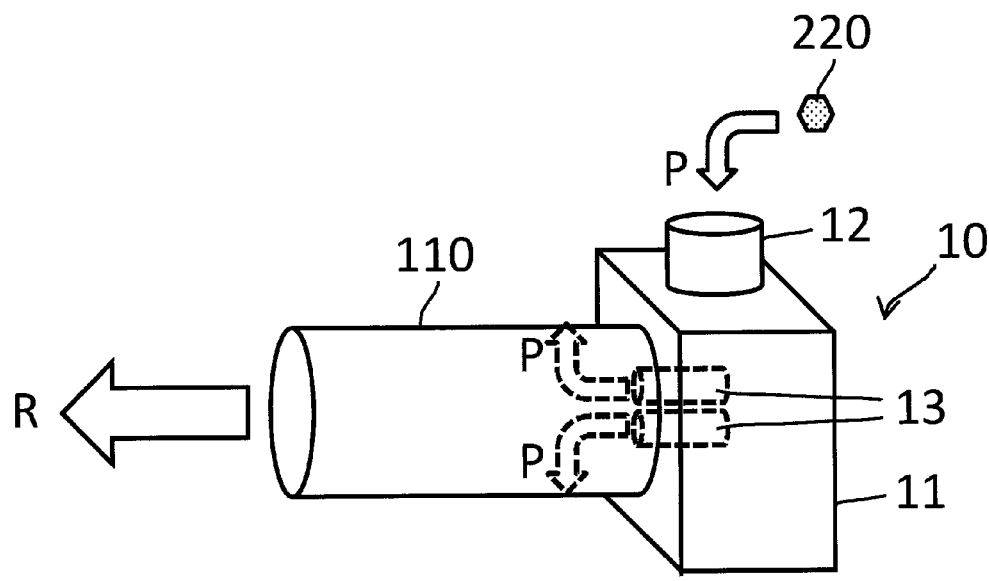
[FIG. 5B]
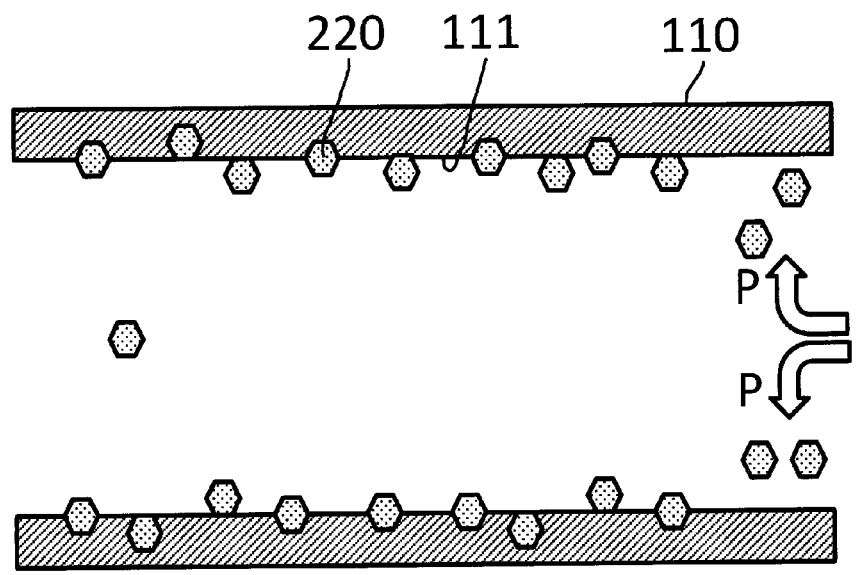

[FIG. 5C]
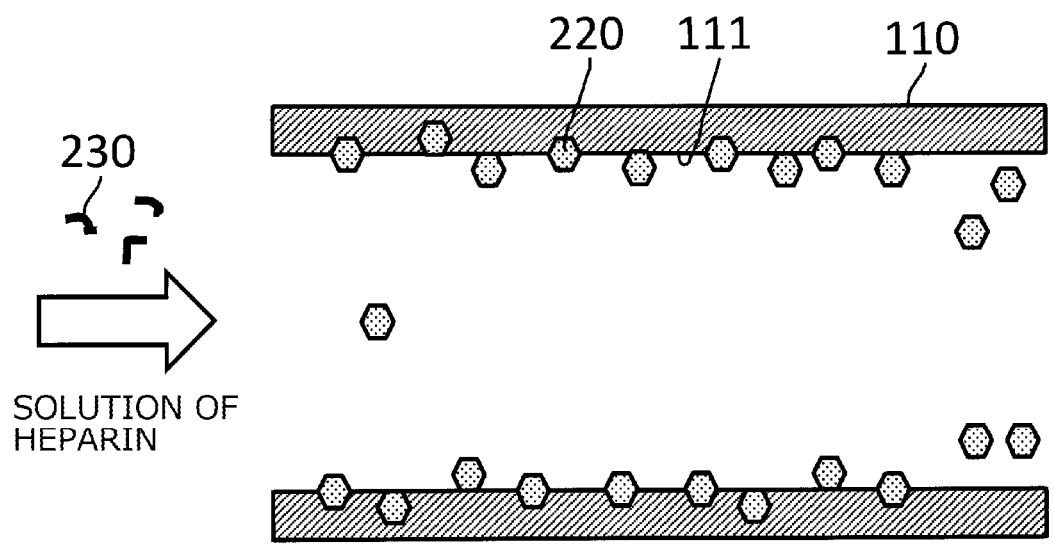
SOLUTION OF HEPARIN
[FIG. 5D]
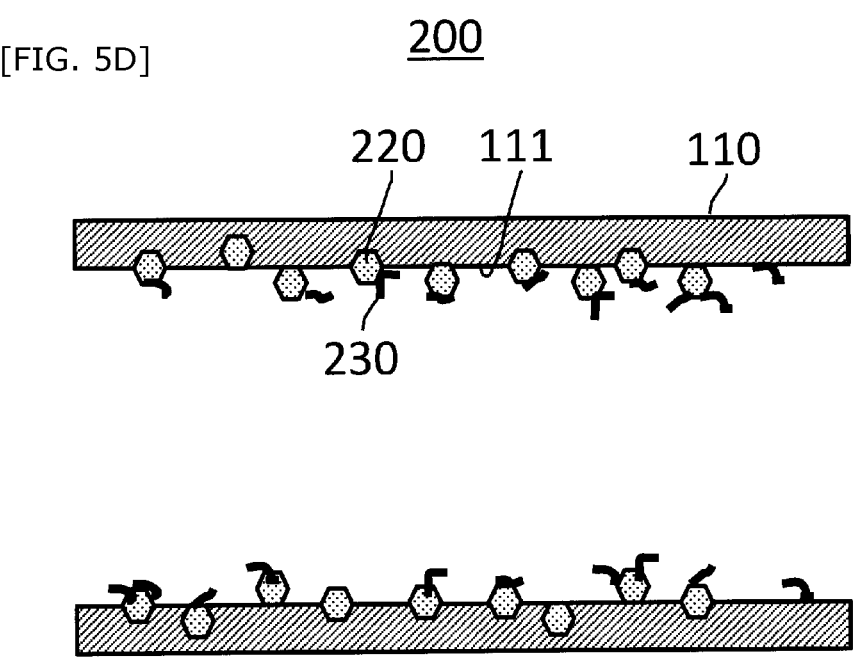

[FIG. 6A]
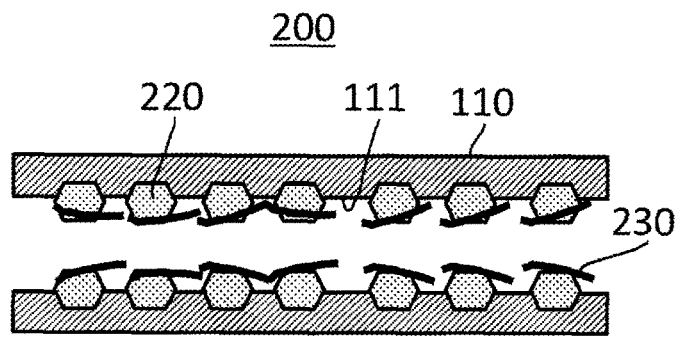
[FIG. 6B]
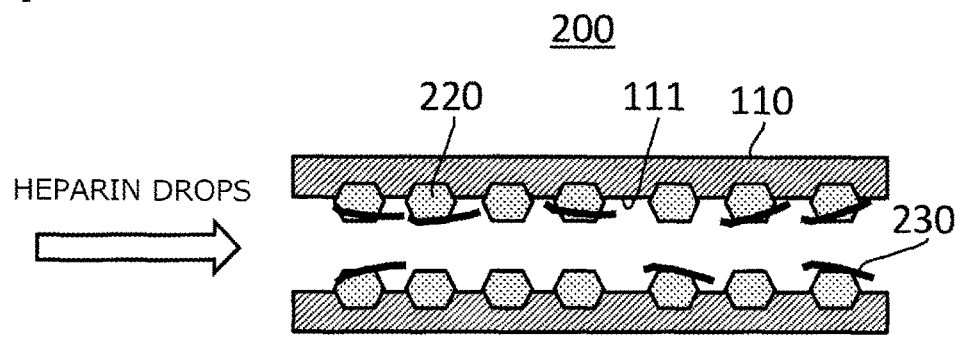
[FIG. 6C]
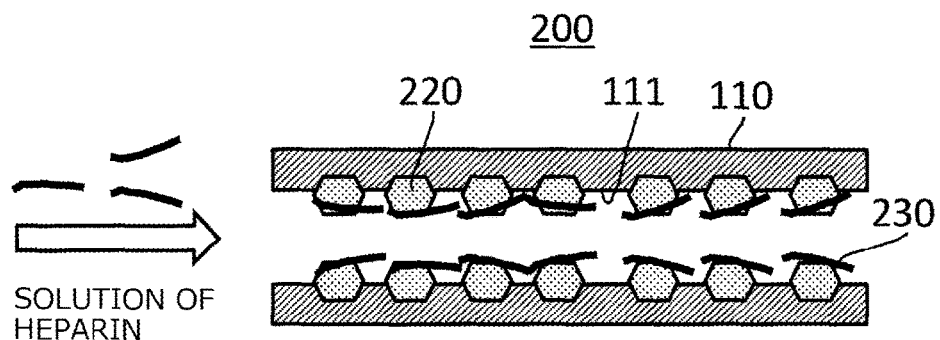

[FIG. 7]
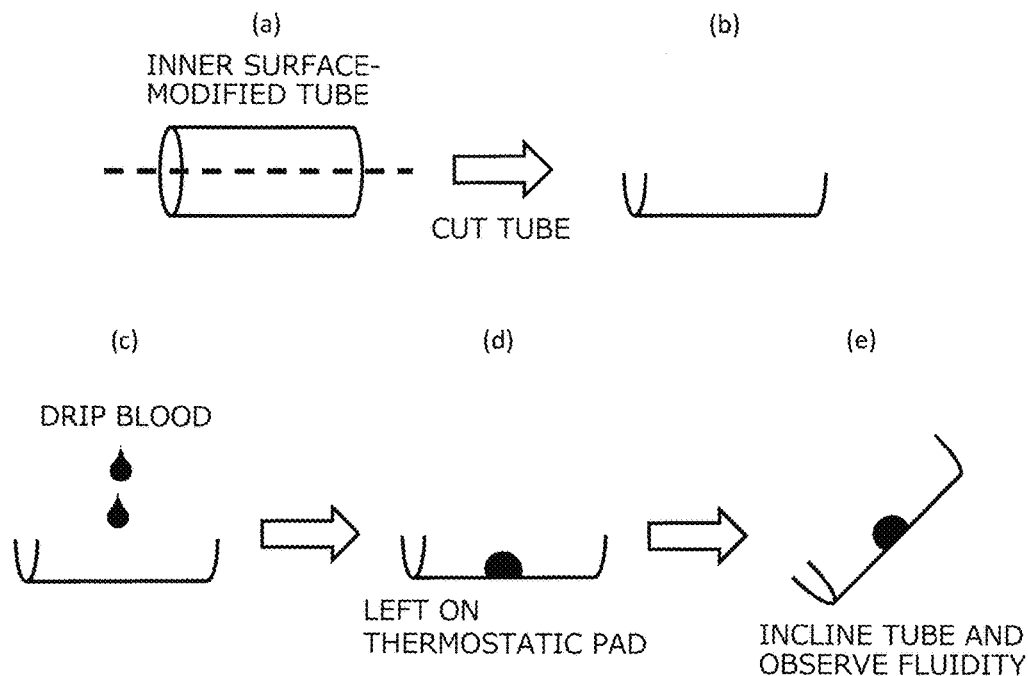
[FIG. 8]
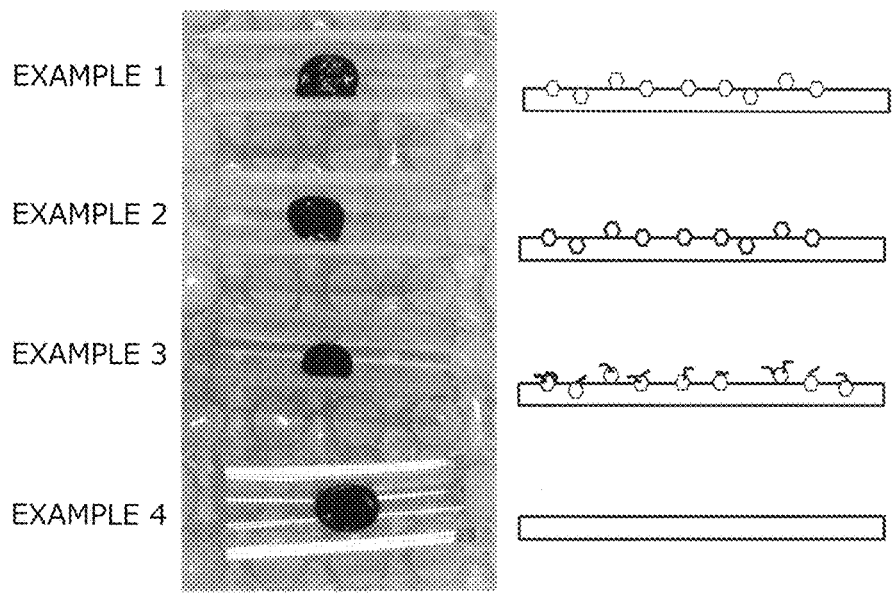

INNER SURFACE-MODIFIED TUBE, INNER SURFACE-MODIFIED TUBE MANUFACTURING METHOD, AND INNER SURFACE-MODIFIED TUBE MANUFACTURING DEVICE

TECHNICAL FIELD

The present invention relates to an inner surface-modified tube with an inner surface of the tube modified.

BACKGROUND ART

Conventionally, surface-modifying treatment of modifying each surface of various materials such as metal and resin plates and pipe materials has been performed for a purpose of providing functions such as waterproofness, corrosion resistance, heat resistance, an insulation property, abrasion resistance, lubricity, adhesion, decorativeness and beauty. There is a case where such surface modification is performed on an inner surface of a tube. In this case, methods for modifying an inner surface of a tube include, for example, a technique of coating an inner surface of a tube made of metal or resin with a resin film having predetermined functions (see, for example, Patent Literatures 1 and 2), and a technique of causing particles having predetermined functions to adhere to an inner surface of a tube made of metal or resin (see, for example, Patent Literatures 3 and 4).

CITATION LIST

Patent Literature

Patent Literature 1: JP 3-186695 A
Patent Literature 2: JP 6-117581 A
Patent Literature 3: JP 62-63679 A
Patent Literature 4: JP 2013-96797 A

SUMMARY OF INVENTION

Technical Problem

However, according to the techniques disclosed in above Patent Literatures 1 and 2, there is a case where an adhesive force between a resin film coating an inner surface of a tube and the inner surface of the tube is insufficient. The insufficient adhesive force is remarkable particularly when different types of materials are used for a material of a tube and a material coating the tube as in the case where a metal tube and a resin film are used. There is a problem that such an insufficient adhesive force readily peels off the resin film. Further, when an inner surface of a tube and a resin film are to be adhered by using an adhesive to improve the adhesive force, it is necessary to select a material which exhibits strong adhesion to improve an adhesive force. Therefore, the degree of freedom of selection of materials for a tube or a film which coats the tube decreases. Further, there is also a method for enhancing an adhesive force by physically or chemically performing surface roughening treatment on an inner surface of a tube. However, in this case, there is a concern that a mechanical property of the tube changes.

Further, according to the techniques disclosed in above Patent Literatures 3 and 4, particles are simply dispersed in a liquid which assists adhesion of the particles to an inner surface of a tube, and are applied to the inner surface. Therefore, it is difficult to secure a sufficient amount of adhesion (sufficient adhered particle amounts) with respect to a unit area of the inner surface of the tube. Further, even when a sufficient amount of adhesion (sufficient adhered particle amounts) can be secured, an adhesive force of particles to the inner surface of the tube is low. Therefore, there is a concern that the adhered particles are easily detached from the inner surface of the tube.

In addition, according to the technique disclosed in Patent Literature 3, particles are adhered to the inner surface of the tube, then are heated and melted and thereby be welded to the inner surface of the tube. The amount of adhered particles is small in the first place, and therefore it is not possible to sufficiently exhibit functions of the particles. Further, even when particles are welded to the inner surface of the tube, a functional substance (particles) is only coated on the inner surface of the tube, a contact area between the inner surface of the tube and the particles is small, and therefore an adhesive force is insufficient.

Thus, according to the techniques disclosed in Patent Literatures 1 to 4, it is not possible to sufficiently exhibit predetermined functions even by performing surface modification to provide the predetermined functions. Even when it is possible to sufficiently exhibit predetermined functions, a resin film having functionality is peeled off or particles having functionality are detached, and therefore it has been difficult to maintain the functions for a long period of time. Further, there is also a problem that, when surface modification is performed on an inner surface of a tube, a peeled resin film or detached particles remain inside a tube.

The present invention has been made in light of the above situation, and it is therefore an object of the present invention to sufficiently exhibit provided functions, and maintain the functions for a long period of time in an inner surface-modified tube whose inner surface has been subjected to surface-modifying treatment to provide the predetermined functions.

Solution to Problem

The inventors of the present invention made diligent studies to solve the above problem and, as a result found that, by burying fine particles in an inner surface of a tube with part of surfaces of the fine particles exposed, and unevenly distributing the fine particles such that more fine particles are distributed in a region from a center of the tube to the inner surface of the tube than in a region from the center of the tube to an outer surface of the tube based on a thickness direction of the tube, it is possible to sufficiently exhibit functions of the fine particles and maintain the functions for a long period of time, and completed the present invention based on this knowledge.

That is, the present invention relates to an inner surface-modified tube in which fine particles are buried in an inner surface of a tube with part of surfaces of the fine particles exposed, and the fine particles are unevenly distributed such that more fine particles are distributed in a region from a center of the tube to the inner surface of the tube than in a region from the center of the tube to an outer surface of the tube based on a thickness direction of the tube, an arithmetic average roughness Ra of the inner surface of the tube is 1 nm or more and 100 µm or less, a particle diameter of each fine particle is 10 nm or more and 100 µm or less, and an inner diameter of the tube is 0.01 mm or more and 100 mm or less.

Preferably, in the inner surface-modified tube, a ratio of a thickness of a portion at which the fine particles are buried, with respect to a thickness of the tube is $1/1{,}000{,}000$ or more and $1/4$ or less.

In the inner surface-modified tube, a material constituting each fine particle may be a material which does not covalently bond or ionically bond to a material constituting the inner surface of the tube.

In the inner surface-modified tube, each fine particle may be an inorganic material or a composite material including the inorganic material and another ingredient.

In this case, the inorganic material may be hydroxyapatite.

In the inner surface-modified tube, each fine particle may be a photocatalytically active material.

The photocatalytically active material may be titanium oxide.

In this case, a material constituting the inner surface of the tube may be a thermoplastic resin.

The surfaces of the fine particles may have a functional substance adsorbed thereon.

In this case, the functional substance may be heparin, warfarin, ethylenediaminetetraacetic acid (EDTA), citric acid or 2-methacryloyloxyethyl phosphorylcholine (MPC) polymer.

Further, the present invention relates to a method for manufacturing the above inner surface-modified tube, and is a method for manufacturing the inner surface-modified tube including a burying step of burying the fine particles in the inner surface of the tube with part of the surfaces of the fine particles exposed by spraying the fine particles to the inner surface of the tube of a melted or semi-melted state.

The method for manufacturing the inner surface-modified tube may further include, subsequently to the burying step, an adsorbing step of causing a functional substance to be adsorbed to the surfaces of the fine particles.

In this case, the method may further include, subsequently to the adsorbing step, an additional adsorbing step of additionally causing the functional substance dropped from the surfaces of the fine particles to be adsorbed to the surfaces of the fine particles to supplement the functional substance after a predetermined time passes.

Further, the present invention relates to a manufacturing device of the inner surface-modified tube which is used for the above manufacturing method, and which includes: a die which is a mold of the tube made of resin; a fine particle supply unit which supplies the fine particles to the die; and a fine particle spray unit which, when an extruder extrudes the tube from the die, sprays the fine particles supplied from the fine particle supply unit, to the inner surface of the tube.

Advantageous Effects of Invention

According to the present invention, in an inner surface-modified tube whose inner surface has been subjected to surface-modifying treatment to provide predetermined functions, the inner surface-modified tube produced by burying fine particles in an inner surface of a tube with part of surfaces of the fine particles exposed, and unevenly distributing the fine particles such that more fine particles are distributed in a region from a center of the tube to the inner surface of the tube than in a region from the center of the tube to an outer surface of the tube based on a thickness direction of the tube, it is possible to sufficiently exhibit the functions of the fine particles and maintain the functions for a long period of time.

BRIEF DESCRIPTION OF DRAWINGS

FIG. 1 is a sectional view illustrating a configuration of an inner surface-modified tube according to a first embodiment of the present invention.

FIGS. 2A and 2B are schematic views illustrating an inner surface-modified tube manufacturing method and a configuration of an inner surface-modified tube manufacturing device according to the first embodiment.

FIG. 3 is a sectional view illustrating a configuration of an inner surface-modified tube according to a second embodiment of the present invention.

FIGS. 4A and 4B are schematic views illustrating an example of an inner surface-modified tube manufacturing method and a configuration of an inner surface-modified tube manufacturing device according to the second embodiment.

FIGS. 5A and 5B are schematic views illustrating another example of the inner surface-modified tube manufacturing method and a configuration of the inner surface-modified tube manufacturing device according to the second embodiment.

FIGS. 5C and 5D are schematic views illustrating another example of the inner surface-modified tube manufacturing method and a configuration of the inner surface-modified tube manufacturing device according to the second embodiment.

FIGS. 6A to 6C are schematic views illustrating an additional adsorbing process in the inner surface-modified tube manufacturing method according to the second embodiment.

FIG. 7 is a schematic view illustrating a testing method of an antithrombogenicity test according to an example of the present invention.

FIG. 8 is a picture illustrating test results of the antithrombogenicity test according to examples of the present invention.

DESCRIPTION OF EMBODIMENTS

Preferred embodiments of the present invention will be described in detail with reference to the drawings. In addition, components assigned with the same reference numerals in this description and the drawings will have substantially same structures or functions.

In addition, an inner surface-modified tube according to the present invention will be described in following order.

1. First Embodiment
1-1 Configuration of Inner Surface-Modified Tube
1-2 Inner Surface-Modified Tube Manufacturing Method and Manufacturing Device
2. Second Embodiment
2-1 Configuration of Inner Surface-Modified Tube
2-2 Inner Surface-Modified Tube Manufacturing Method and Manufacturing Device
3. Usage of Inner Surface-Modified Tube according to Present Invention <<First Embodiment>>

First, an inner surface-modified tube 100 according to the first embodiment of the present invention will be described with reference to FIGS. 1 to 2B. FIG. 1 is a sectional view illustrating a configuration of the inner surface-modified tube 100 according to the present embodiment. FIGS. 2A and 2B are schematic views illustrating a manufacturing method of the inner surface-modified tube 100 and a manufacturing device of the inner surface-modified tube 100 according to the present embodiment. Hereinafter, the configuration of the inner surface-modified tube 100 will be described, and then a method for manufacturing the inner surface-modified tube 100 and an example of a device used for this manufacturing method will be described.

<Configuration of Inner Surface-Modified Tube 100>

As illustrated in FIG. 1, in the inner surface-modified tube 100, fine particles 120 are buried in an inner surface 111 of a tube 110. These fine particles 120 have predetermined functions (e.g. an antithrombogenic function, a photocatalyst function and the like), and, consequently, can modify the inner surface 111 of the tube 110 and provide the predetermined functions. In this regard, the predetermined functions are not limited to the antithrombogenic function and the photocatalyst function, and may be functions such as an antibacterial property, bioactivity, biocompatibility, a bioinert property, waterproofness, hydrophobicity, water repellency, hydrophilicity, corrosion resistance, heat resistance, an insulation property, abrasion resistance, lubricity, and adhesion to other materials.

[Significance of Burial]

In this regard, that the fine particles 120 are "buried" in the inner surface 111 of the tube 110 means a state where part of surfaces of the fine particles 120 are exposed and other part of the surfaces of the fine particles 120 are buried in the inner surface 111 of the tube 110, i.e., a state where the other part are inside an inner wall of the tube 110. That is, in the state where the fine particles 120 are buried in the inner surface 111 of the tube 110, each fine particle 120 includes an exposed region which is exposed from the inner surface 111 of the tube 110 to an outside (an internal space of the tube 110), and a buried region which is inside the inner wall of the tube 110. Hence, this state is different from a state where the fine particles 120 simply adhere to the inner surface 111 of the tube 110 (this state includes cases where the fine particles 120 directly adhere to the inner surface 111 and a case where the fine particles 120 adhere to the inner surface 111 via an adhesive), and a state where the inner surface 111 of the tube 110 is coated with a film or a layer including the fine particles 120.

Thus, although described in detail below, to bury the fine particles 120 in the tube 110, it is necessary to spray the fine particles 120 toward a surface which serves as the inner surface 111 of the tube 110 in a state where, for example, a material constituting the tube 110 is melted in a process of molding the tube 110. Consequently, it is possible to realize surface modification of the inner surface 111 of the tube 110 (e.g. provide predetermined functions).

Further, each fine particle 120 includes the exposed region and the buried region and, consequently, provides the following effect. Even when, for example, the functions of each fine particle 120 deteriorate due to corrosion of the exposed region of the surface of the fine particle 120, the buried region at an inner surface side of the exposed region (the side in a direction of an arrow $W_O$ in FIG. 1) includes a portion whose functions are not deteriorated. Consequently, it is possible to maintain the functions of each fine particle 120 for a long period of time by exposing this portion to the surface.

[Tube 110]

The tube 110 is a tube which is a base material of the inner surface-modified tube 100. A sectional shape of the tube 110 is not limited in particular, and may be any shape such as a circular shape, an elliptical shape or a polygonal shape.

(Material)

A material of the tube 110 is not limited in particular, either, and any material such as metals or resins can be used for the tube 110. Metals which can be used for the tube 110 include, for example, iron, steel, stainless steel, aluminum, copper, nickel, titanium, tantalum, niobium and alloy thereof. Various plating or surface treatment may be performed on an outer surface of a tube made of these metals or alloy. Further, resins which can be used for the tube 110 may be thermoplastic resins and thermosetting resins. The thermosetting resins include, for example, phenolic resin, epoxy resin, melamine resin, urea formaldehyde resin, polyurethane, thermosetting polyimide and the like. Further, the thermoplastic resins include, for example, commodity plastics such as polyethylene, polypropylene, polyvinyl chloride, polystyrene, ABS resin and acrylic resin, engineering plastics such as polyacetal, polyamide, polycarbonate, modified-polyphenylene ether, polyethylene terephthalate and polytetrafluoroethylene, and bioabsorbable polymers such as polylactic acid, polyglycolic acid and copolymers thereof. From a viewpoint of making it easy to manufacture the inner surface-modified tube 100 according to the present embodiment, it is preferable to use the thermoplastic resins for the tube 110 among these resins. The above material of the tube 110 may be appropriately determined according to usage of the inner surface-modified tube 100 and an adhesive force of the fine particles 120 to the inner surface 111.

(Inner Diameter)

An inner diameter $r_T$ of the tube 110 is 0.01 mm or more and 100 mm or less. By setting the inner diameter $r_T$ of the tube 110 to the above range, and setting surface roughness of the inner surface 111 to a predetermined range and setting a particle diameter of each fine particle 120 to a predetermined range as described below, it is possible to prevent occurrence of a turbulent flow when a fluid is passed through the inner surface-modified tube 110. To more effectively prevent the occurrence of a turbulent flow, a lower limit of the inner diameter $r_T$ of the tube 110 is preferably set to 0.1 mm or more, and is more preferably set to 0.5 mm or more. Further, an upper limit $r_T$ of an inner diameter of the tube 110 is preferably 80 mm or less and is more preferably 50 mm or less.

(Surface Roughness of Inner Surface 111)

Further, an arithmetic average roughness Ra of the inner surface 111 of the tube 110 is 1 nm or more and 100 μm or less. By setting Ra of the inner surface 111 to the above range, and setting an inner diameter $r_T$ of the tube 110 to a predetermined range and setting a particle diameter of each fine particle 120 to a predetermined range, it is possible to prevent occurrence of a turbulent flow when a fluid is passed through the inner surface-modified tube 110. To more effectively prevent the occurrence of a turbulent flow, a lower limit of Ra of the inner surface 111 is preferably set to 5 nm or more, and is more preferably set to 10 nm or more. Further, an upper limit of Ra of the inner surface 111 is preferably 50 μm or less and is more preferably 30 μm or less.

In this regard, the arithmetic average roughness Ra according to the present embodiment means arithmetic average roughness defined according to JIS B0601:2013. A measurement value of the arithmetic average roughness Ra of the inner surface 111 of the tube 110 takes a value measured based on a measuring method defined according to JIS B0659-1:2002 by, for example, cutting the tube 110 along a cross sectional plane (crosswise) such that the tube 110 has a predetermined length, then cutting and opening the tube 110 along a longitudinal direction, and placing the tube 110 in a flat state.

[Fine Particle 120]

Each fine particle 120 is a fine particle which is buried (see, the above-described definition) in the inner surface 111 of the tube 110. Each fine particle 120 has predetermined functions (e.g. the functions of providing antithrombogenicity, photocatalytic activity, waterproofness, corrosion resistance, heat resistance, an insulation property, abrasion resistance, lubricity, and adhesion to other materials. A shape of each fine particle 120 is not limited in particular, and may be any shape such as geometric shapes such as a spherical shape, a spheroidal shape, a cube shape, a cuboid shape and a pyramidal shape, a needle shape, a columnar shape and an indeterminate shape.

(Material)

A material of each fine particle 120 is not limited in particular, either. For example, the material constituting each fine particle 120 may be a material which does not covalently bond or ionically bond to a material constituting the inner surface 111 of the tube 110 (a material of an unprocessed state for which predetermined surface treatment such as surface oxidation and silane coupling, and predetermined treatment such as coating treatment of coating the inner surface 111 with a layer made of a material which can chemically bond to each fine particle 120 are not performed). Thus, even when each fine particle 120 is a particle which cannot chemically bond to a material which constitutes the inner surface 111 of the tube 110, it is possible to fix each fine particle 120 fast to the inner surface 111 by burying each fine particle 120 in the inner surface 111 as in the present embodiment.

A material of each fine particle 120 may be appropriately selected according to usage, and may be an organic material or an inorganic material. For example, for each fine particle 120, it is possible to use an inorganic material or a composite material including the inorganic material and other ingredients. In particular, by using a material such as hydroxyapatite having biocompatibility as an inorganic material for each fine particle 120, it is possible to use each fine particle 120 for usage which requires biocompatibility in the inside of the inner surface-modified tube 100. Further, hydroxyapatite of the order of nanometers calcined by a specific method exhibits high biocompatibility. Consequently, when the calcined hydroxyapatite or a composite material including the calcined hydroxyapatite is used, high biocompatibility and/or antithrombogenicity would be provided to an inner wall of the inner surface-modified tube 100.

Further, for each fine particle 120, a material having photocatalytic activity (photocatalytically active material) may be used. By using such a material for each fine particle 120, it is possible to use the inner surface-modified tube 100 for usage which requires removal of contaminated materials or bacteria adhered to the inside of the inner surface-modified tube 100. A photocatalytically active material is not limited in particular, yet is, for example, titanium oxide. Titanium oxide having an anatase-type crystal structure in particular is suitable.

(Particle Diameter)

A particle diameter $r_P$ of each fine particle 120 according to the present embodiment is 10 nm or more and 100 μm or less. By setting the particle diameter rp of each fine particle 120 to the above range, and setting the inner diameter $r_T$ of the tube 110 to a predetermined range and setting the arithmetic average roughness Ra of the inner surface 111 of the tube 110 to a predetermined range, it is possible to prevent occurrence of a turbulent flow when a fluid is passed through the inner surface-modified tube 110. To more effectively prevent the occurrence of a turbulent flow, a lower limit of the particle diameter $r_P$ of each fine particle 120 is preferably set to 15 nm or more, and is more preferably set to 20 nm or more. Further, an upper limit of the particle diameter $r_P$ of each fine particle 120 is preferably 50 μm or less and is more preferably 10 μm or less.

In this regard, the particle diameter of each fine particle 120 according to the present embodiment means the number-average particle diameter of primary particles. Further, a particle diameter of each particle takes a value measured as a length in the thickness direction of the tube 110. Furthermore, the particle diameter of each fine particle 120 is measured by measuring a particle diameter (the length in the thickness direction of the tube 110 in the present embodiment) of at least 100 or more primary particles by using an electron microscope, and calculating an average value of the particle diameters.

(Turbulent Flow Occurrence Prevention Effect)

By setting the inner diameter $r_T$ of the tube 110, the arithmetic average roughness Ra of the inner surface 111 of the tube 110 and the particle diameter $r_P$ of each fine particle 120 to the predetermined ranges as described above, it is possible to prevent occurrence of a turbulent flow when a fluid is passed through the inner surface-modified tube 110. A flow path having a roughened surface does not form a laminar flow and most of the tube interior serves as a turbulent flow region, whereas the smoother inner surface 111 of the tube 110 is more advantageous for formation of a laminar flow region. In the present embodiment, the particle diameter $r_P$ of each fine particle 120 is small with respect to the inner diameter $r_T$ of the tube 110, and the arithmetic average roughness Ra is small, so that it is possible to effectively prevent occurrence of a turbulent flow. Thus, by preventing occurrence of a turbulent flow in the inner surface-modified tube 110, it is possible to prevent each fine particle 120 from dropping from the inner surface 111 of the tube 110. Further, in a region in which each fine particle 120 is buried in the inner surface-modified tube 100, too, it is possible to pass a fluid comparably to a case where each fine particle 120 is not buried. Consequently, modification of the inner surface does not block a flow of a fluid.

(Uneven Distribution of Fine Particles 120)

Further, in the present embodiment, fine particles 120 are unevenly distributed such that more fine particles 120 are distributed in an region A2 from a center C of the tube 110 to the inner surface of the tube 110 (a direction of an arrow $W_I$ in FIG. 1) than in a region A1 from the center C of the tube 110 to an outer surface of the tube 110 (a direction of an arrow $W_O$ in FIG. 1) based on the thickness direction of the tube 110. Thus, fine particles 120 are distributed more in the region A2. Consequently, it is possible to secure a mechanical property of the material (base material) of the tube 110 (maintain the mechanical property of the tube 110 in a state where the inner surface 111 is not modified). In addition, FIG. 1 illustrates an example where the fine particles 120 exist only in the region A2 in the tube 110. However, part of the fine particles 120 may exist in the region A1 (in this case, the fine particles 120 naturally exist in the region A2, yet have a larger volume in the region A2 than a volume in the region A1).

In order to more effectively exhibit the effect of securing the mechanical property, a ratio of a thickness $L_B$ of a portion at which each fine particle 120 is buried (referred to as a "buried portion" below) with respect to a thickness $L_T$ of the tube 110 (the ratio $L_B/L_T$ is referred to as an "uneven distribution amount" below) is preferably 1/1,000,000 or more and 1/4 or less. The ratio is more preferably 1/500,000 or more and 1/10 or less. The ratio is still more preferably 1/10,000 or more and 1/100 or less. A value of the uneven distribution amount takes a value obtained by measuring the thickness $L_B$ of the buried portion of each of at least the 100 or more fine particles 120 by using an electron microscope and dividing an average value of the thicknesses $L_B$ by the thickness LT of the tube 110.

<Manufacturing Method and Manufacturing Device of Inner Surface-Modified Tube 100>

The configuration of the inner surface-modified tube 100 according to the present embodiment has been described above. Next, a method for manufacturing the inner surface-modified tube 100 employing such a configuration, and the manufacturing device used for this manufacturing method will be described in detail with reference to FIGS. 2A and 2B.

[Configuration of Manufacturing Device 10]

When, for example, the tube 110 is made of resin, the inner surface-modified tube 100 can be manufactured by using the inner surface-modified tube manufacturing device 10 (referred to as a "manufacturing device 10" below) illustrated in FIG. 2A. As illustrated in FIG. 2A, the manufacturing device 10 includes a die 11, a fine particle supply port 12 which is an example of a fine particle supply unit according to the present embodiment, and a fine particle spray nozzle 13 which is an example of a fine particle spray unit according to the present embodiment.

(Die 11)

The die 11 is a mold for molding the tube 110 made of resin. The tube 110 can be molded by filling in the die 11 resin which is a material of the tube 110 and extruding the resin from the die 11 by an extruder (not illustrated). A temperature (elution temperature) at which the resin constituting the tube 110 is extruded from the die 11 is not limited in particular, and needs to be a temperature equal to or more than a melting point or a softening point of resin.

(Fine Particle Supply Port 12)

Further, the fine particle supply port 12 is a loading port for supplying the fine particles 120 into the die 11. This fine particle supply port 12 is connecting to the fine particle spray nozzle 13. By loading the fine particles 120 through the fine particle supply port 12, the fine particles 120 reach the fine particle spray nozzle 13 installed in the die 11.

(Fine Particle Spray Nozzle 13)

The fine particle spray nozzle 13 is installed in the die 11, and sprays the fine particles 120 supplied from the fine particle supply port 12, toward the inner surface 111 of the tube 110 of melted state (including a semi-melted state which applies likewise below) extruded from the die 11 by the extruder. This fine particle spray nozzle 13 mixes the fine particles 120 with gas having a predetermined pressure and a predetermined flow rate and sprays the mixture. A gas pressure and flow rate may be appropriately set according to an extruding speed of the resin from the die 11.

[Manufacturing Method of Inner Surface-Modified Tube 100]

By using the above-described manufacturing device 10, it is possible to manufacture the inner surface-modified tube 100 in which the fine particles 120 are buried in the inner surface 111 of the tube 110 made of resin according to the following method. More specifically, as illustrated in FIG. 2B, the method for manufacturing the inner surface-modified tube 100 according to the present embodiment includes a burying process of burying the part of surfaces of fine particles 120 in the inner surface of the tube 110 by spraying the fine particles 120 from the fine particle spray nozzle 13 to the inner surface of the tube 110 of a melted or semi-melted state extruded from the die 11 by the extruder.

(Melted State)

In this regard, in the above burying process, when the fine particles 120 are sprayed from the fine particle spray nozzle 13, the entire tube 110 may be in a melted state, or at least the inner surface 111 of the tube 110 may be in a melted state. Further, "a melted state (or a semi-melted state)" according to the present embodiment means a state where, when the fine particles 120 are sprayed to the inner surface 111 by using gas (air, inert gas, or the like) of a predetermined pressure and flow rate, the melted or semi-melted portion has such softness that the fine particles 120 are buried (embedded) in the inner surface 111 with part of the surfaces of the fine particles 120 exposed. The resin constituting the tube 110 does not necessarily need to be a temperature equal to or more than a melting point or a softening point.

(Method for Spraying Fine Particles 120)

Further, a method for spraying the fine particles 120 to the inner surface 111 of the tube 110 may include spraying the fine particles 120 to the inner surface 111 in the manufacturing or molding process of the tube 110 by taking advantage of a melted state of a material constituting the tube 110 in the manufacturing or molding process of the tube 110, and may include heating the tube 110 after the tube 110 is manufactured or molded, and spraying the fine particles 120 in a state where at least the inner surface 111 is melted.

(Manufacturing Conditions)

An elution temperature at which the resin constituting the tube 110 is extruded from the die 11, and an air pressure and an air flow rate of the fine particle spray nozzle 13 at which the fine particles 120 are sprayed to the inner surface 111 are not limited in particular. However, to realize the above-described buried state and uneven distribution amount of the fine particles 120, and suitable range of the arithmetic average roughness Ra of the inner surface 111 of the tube 110, the elution temperature is preferably 100 to 500° C. Further, the air pressure is preferably 0 to 1 MPa and is more preferably 0.001 to 1 MPa. Furthermore, the air flow rate is preferably 0 to 500 L/minute and is more preferably 0.0001 to 500 L/minute.

(Others)

In addition, when the tube 110 is made of resin, the manufacturing device of the inner surface-modified tube 100 may be manufacturing devices other than the above-described manufacturing device 10. As long as devices can perform the above-described manufacturing method, the devices are not limited in particular. Further, when the tube 110 is made of a material other than resin (e.g. metal), the inner surface-modified tube 100 is naturally manufactured by devices other than the manufacturing device 10. Even in this case, a device which can place at least the inner surface 111 of the tube 110 in the melted state and spray the fine particles 120 to the inner surface 111 in this melted state can be used as a manufacturing device of the inner surface-modified tube 100.

<<Second Embodiment>>

Next, an inner surface-modified tube 200 according to the second embodiment of the present invention will be described with reference to FIGS. 3 to 6C. FIG. 3 is a sectional view illustrating a configuration of the inner surface-modified tube 200 according to the present embodiment. FIGS. 4A and 4B are schematic views illustrating an example of a manufacturing method of the inner surface-modified tube 200 and a configuration of a manufacturing device of the inner surface-modified tube 200 according to the present embodiment. FIGS. 5A to 5D are schematic views illustrating another example of a manufacturing method of the inner surface-modified tube 200 and a configuration of a manufacturing device of the inner surface-modified tube 200 according to the present embodiment. FIGS. 6A to 6C are schematic views illustrating an additional adsorbing process in the manufacturing method of the inner surface-modified tube 200 according to the present embodiment. The configuration of the inner surface-modified tube 200 will be described below, and then a method for manufacturing the inner surface-modified tube 200 and an example of a device used for this manufacturing method will be described.

<Configuration of Inner Surface-Modified Tube 200>

As illustrated in FIG. 3, the inner surface-modified tube 200 is formed by burying fine particles 220 in an inner surface 111 of a tube 110, and causing a functional substance 230 to be adsorbed to surfaces of the fine particles 220. The functional substance 230 fixed to the inner surface 111 of the tube 110 via the fine particles 220 has predetermined functions (e.g. an antithrombogenic function, a photocatalyst function and the like), and, consequently, can modify the inner surface 111 of the tube 110 and provide the predetermined functions. In addition, predetermined functions are the same as those of the first embodiment. Thus, the inner surface-modified tube 200 according to the present embodiment differs from an inner surface-modified tube 100 according to the first embodiment in modifying the inner surface 111 of the tube 110 by using the functional substance 230 instead of the fine particles 220. Differences of components of the inner surface-modified tube 200 from those of the first embodiment will be described, and other components are the same as those of the first embodiment and therefore will not be described.

[Fine Particle 220] The fine particles 220 are basically the same as above-described fine particles 120, yet differ from the fine particles 120 in that the fine particles 220 do not necessarily have predetermined functions. That is, in the first embodiment, the functional substance 230 is not provided. Therefore, the fine particles 120 need to have predetermined functions of modifying the inner surface 111. However, in the present embodiment, it is possible to provide the predetermined functions of modifying the inner surface 111 by using the functional substance 230. Consequently, the fine particles 220 do not need to have the predetermined functions.

Further, unlike each fine particle 120, each fine particle 220 needs to have a property of physically or chemically adsorbing each functional substance 230 to a surface of the fine particle 220. Such a property makes it possible to fix the functional substance 230 to the inner surface 111 of the tube 110 via the fine particles 220, modify the inner surface 111 and provide the predetermined functions.

[Functional Substance 230]

Each functional substance 230 is a substance having predetermined functions such as an antithrombogenic function and a photocatalyst function as described above. The shape of each functional substance 230 is not limited in particular, and can be formed in any shape such as a granular shape, a needle shape or an indeterminate shape. Further, a size of each functional substance 230 is not limited in particular, either, and needs to be such a size that each functional substance 230 is adsorbed to and is not readily detached from each fine particle 220. Functions of each functional substance 230 may be the same as those of the above fine particles 120.

A specific example of each functional substance 230 is not limited in particular. When, for example, each fine particle 220 is hydroxyapatite or a composite material including hydroxyapatite, heparin, warfarin, ethylenediaminetetraacetic acid (EDTA), citric acid or 2-methacryloyloxyethyl phosphorylcholine (MPC) polymer can be used. Such a substance has good adsorptivity with respect to hydroxyapatite, and antithrombogenicity. Hence, when the above substance is used for the functional substance 230, it is possible to use the inner surface-modified tube 200 for usage in a tube which passes blood (e.g. a catheter for dialysis or a heart-lung machine). When the inner surface-modified tube 200 provided with the antithrombogenic function is used for such usage, it is possible to remarkably prevent coagulation of blood in a tube.

<Manufacturing Method and Manufacturing Device of Inner Surface-Modified Tube 200>

The configuration of the inner surface-modified tube 200 according to the present embodiment has been described above. Next, a method for manufacturing the inner surface-modified tube 200 employing such a configuration, and the manufacturing device used for this manufacturing method will be described in detail with reference to FIGS. 4A to 6C.

[Configuration of Manufacturing Device 10]

When, for example, the tube 110 is made of resin, the inner surface-modified tube 200 can be manufactured by using a manufacturing device 10 identical to that of the above first embodiment. In addition, detailed description of the manufacturing device 10 overlaps that of the first embodiment and therefore will be omitted.

[Manufacturing Method of Inner Surface-Modified Tube 200]

By using the above manufacturing device 10, it is possible to manufacture the inner surface-modified tube 200 in which the fine particles 220 are buried in the inner surface 111 of the tube 110 made of resin and the functional substance 230 is adsorbed to the surfaces of the fine particles 220 according to the following method. More specifically, the method for manufacturing the inner surface-modified tube 200 according to the present embodiment further includes, subsequently to the above-described burying process according to the first embodiment, an adsorbing process of causing the functional substance 230 to be adsorbed to the surfaces of the fine particles 220. This adsorbing process can mainly be conducted by a method (referred to as a "manufacturing method 1" below) for causing the functional substance 230 to be adsorbed to the surfaces of the fine particles 220 in advance, and then spraying the fine particles 220 with the functional substance 230 adsorbed, to the inner surface 111 of the tube 110 of a melted state or a semi-melted state, or a method (referred to as a "manufacturing method 2" below) for spraying the fine particles 220 to the inner surface 111 of the tube 110 of the melted state or the semi-melted state, and then causing the functional substance 230 to be adsorbed to the fine particles 220 buried in the inner surface 111. Detailed methods will be described below in order of the manufacturing method 1 and the manufacturing method 2. Note that the adsorbing process may be conducted by a method other than the manufacturing method 1 and the manufacturing method 2.

(Adsorbing Process: Manufacturing Method 1)

The manufacturing method 1 includes loading the fine particles 220 (e.g. hydroxyapatite) whose surfaces have the functional substance 230 (e.g. heparin) adsorbed (or coated) thereon in advance, through the fine particle supply port 12 as illustrated in FIG. 4A, and spraying the fine particles 220 from a fine particle spray nozzle 13 to the inner surface 111 of the tube 110 of the melted state or the semi-melted state extruded from a die 11 as illustrated in FIGS. 4A and 4B. With this process, it is possible to manufacture the inner surface-modified tube 200 in one step (at the same time as extrusion molding of the tube 110). Note that although FIGS. 4A and 4B illustrate a state where the entire surfaces of the fine particles 220 are coated with the functional substance 230, part of the surfaces of the fine particles 220 may have the functional substance 230 adsorbed thereon.

(Adsorbing Process: Manufacturing Method 2)

According to the manufacturing method 2, as illustrated in FIGS. 5A and 5B, the fine particles 220 are buried in the inner surface 111 of the tube 110 first as in the above-described first embodiment. Next, inside the tube 110 in which the fine particles 220 are buried in the inner surface 111, a solution of the functional substance 230 (e.g. a solution of heparin obtained by dispersing heparin in a solvent such as water) is circulated. Thus, when passing in the tube 110, the functional substance 230 is physically or chemically adsorbed to the surfaces of the fine particles 220 existing on the way in the tube 110, so that it is possible to manufacture the inner surface-modified tube 200. This manufacturing method 2 does not make it possible to manufacture the inner surface-modified tube 200 in one step unlike the manufacturing method 1, yet provides the following advantages. That is, in case of the manufacturing method 1, when the fine particles 220 are buried in the inner surface 111 of the tube 110, since the functional substance 230 exists in an interface 111 of the inner surface 110, an adhesive force of the fine particles 220 with respect to the inner surface 111 is likely to decrease. However, the manufacturing method 2 does not cause such a decrease, and can increase the adhesive force of the fine particles 220 with respect to the inner surface 111. Further, when the functional substance 230 is a rare substance, it is possible to provide an advantage that it is possible to efficiently fix the functional substance 230 only to exposed surfaces of the fine particles 220 which are required to provide functions.

(Additional Adsorbing Process)

Further, the method for manufacturing the inner surface-modified tube 200 according to the present embodiment may further include, subsequently to the adsorbing process, an additional adsorbing process of additionally causing the functional substance 230 to be adsorbed to the surfaces of the fine particles 220 to supplement the functional substance 230 dropped from the surfaces of the fine particles 220 after a predetermined time passes. The additional adsorbing process will be described with reference to the drawings. For example, assume a case where, while the inner surface-modified tube 200 manufactured by the burying process and the adsorbing process is used as illustrated in FIG. 6A, the functional substance 230 (e.g. heparin) drops from the surfaces of the fine particles 220 as illustrated in FIG. 6B, and the functions of the inner surface-modified tube 200 (e.g. antithrombogenic function) lower. In this case, for example, similarly to the manufacturing method 2, according to a simple method of recirculating a solution of the functional substance 230 (e.g. a solution of heparin) in the inner surface-modified tube 200 from which the functional substance 230 has dropped as illustrated in FIG. 6C, it is possible to cause the functional substance 230 again to be adsorbed to the surfaces of the fine particles 220 from which the functional substance 230 has dropped. Consequently, it is possible to restore the same functions as those obtained when the inner surface-modified tube 200 is manufactured. Note that the method of the additional adsorbing process is not limited to the method such as the manufacturing method 2 of the above adsorbing process. The method is not limited in particular as long as a method makes it possible to cause the functional substance 230 again to be adsorbed to the surfaces of the fine particles 220 from which the functional substance 230 has dropped.

By using this additional adsorbing process, the inner surface-modified tube 200 can maintain the functions of the functional substance 230 for a long period of time (semi-permanently depending on cases). For example, assume a case where the inner surface-modified tube 200 that includes the functional substance 230 made of a substance such as heparin having antithrombogenicity and includes the fine particles 220 made of a material such as hydroxyapatite which can adsorb the functional substance 230 is used as a catheter for dialysis or a heart-lung machine. In this case, there is a case where the functional substance 230 such as heparin drop from the surfaces of the fine particles 220 in a process of using the inner surface-modified tube 200 as a catheter. According to the simple method of circulating a solution of the functional substance 230 such as a solution of heparin in a state where the inner surface-modified tube 200 is inserted in a body, it is possible to restore an antithrombogenic function of heparin.

<<Usage of Inner Surface-Modified Tube According to Present Invention>>

The inner surface-modified tube according to the present invention including the first embodiment and the second embodiment described above can be used for various applications aimed at antithrombogenicity, controlling infection, inhibiting biofilm formation and/or removing biofilms and so on, such as catheters, extracorporeal circulation tubes and blood circuits used for dialysis, heart-lung machines and tube feeding, etc., and catheters, drain tubes, artificial blood vessels and stent grafts and so on used for digestive treatment, cardiovascular treatment, surgical treatment, respiratory treatment and/or neurosurgical treatment, etc.

EXAMPLES

Next, the present invention will be more specifically described with reference to examples and a comparative example. However, the present invention is by no means limited to these examples.

[Making of Inner Surface-Modified Tube]

In this example, inner surface-modified tubes according to Examples 1 to 3 were made by using the method for manufacturing the inner surface-modified tube 100 according to the first embodiment, and each of the manufacturing method 1 and the manufacturing method 2 of the inner surface-modified tube 200 according to the second embodiment. More specifically, a tube (inner diameter: 12 mm) made of polyvinyl chloride was used as the tube, fine particles of hydroxyapatite (average particle diameter: 42 nm of "SHAp" made by SofSera Corporation) were used as the fine particles, and heparin sodium was used as the functional substance to make the inner surface-modified tube illustrated in the following table 1. Further, a tube made of polyvinyl chloride (which is the same as those used for Examples 1 to 3) was used in an unprocessed state for Comparative Example 1 for reference.

TABLE 1

| | Inner surface-modified tube | | | |
|---|---|---|---|---|
| | Tube material | Fine particle | Functional substance | Manufacturing method |
| Example 1 | Polyvinyl chloride (Inner diameter 12 mm) | SHAp (Particle diameter: 42 nm) | — | First embodiment |
| Example 2 | Polyvinyl chloride (Inner diameter 12 mm) | SHAp (Particle diameter: 42 nm) | Heparin | Second embodiment: manufacturing method 1 |
| Example 3 | Polyvinyl chloride | SHAp (Particle | Heparin | Second embodiment: |

TABLE 1-continued

Inner surface-modified tube

|  | Tube material | Fine particle | Functional substance | Manufacturing method |
|---|---|---|---|---|
| Comparative Example 1 | (Inner diameter 12 mm) Polyvinyl chloride (Inner diameter 12 mm) | diameter: 42 nm | — | manufacturing method 2 Unprocessed |

[Measurement of Surface Roughness and Uneven Distribution Amount]

An arithmetic average roughness Ra (nm) and an uneven distribution amount $L_B/L_T$ of each inner surface of the inner surface-modified tubes according to Examples 1 to 3 and Comparative Example 1 made as described above were measured. Methods for measuring the arithmetic average roughness Ra (nm) and the uneven distribution amount $L_B/L_T$ are as described above, and detailed conditions of the method for measuring the arithmetic average roughness Ra are as follows. First, the inner surface-modified tubes according to Examples 1 to 3 and Comparative Example 1 were cut along a cross sectional plane (crosswise) to obtain tube samples whose lengths were 20 mm. These tube samples were cut along a longitudinal direction to make thin pieces by a microtome. A picture of each inner surface of the tube was taken at a magnification of 50,000 by a scanning electron microscope (SEM) by using the thin piece to calculate the arithmetic average roughness Ra from the obtained SEM image.

[Testing Method]

Antithrombogenicity tests were conducted by using the inner surface-modified tubes according to Examples 1 to 3 and Comparative Example 1 made as described above. More specifically, as illustrated in (a) and (b) of FIG. 7, the inner surface-modified tubes according to Examples 1 to 3 and Comparative Example 1 were each cut open along a major axis to keep a temperature on a thermostatic pad at 37° C. Next, as illustrated in (c) of FIG. 7, blood of approximately 0.2 mL of a rabbit (Japanese white, male, 2.97 kg) was calmly dripped on each of the inner surface-modified tubes according to Examples 1 to 3 and Comparative Example 1 whose temperatures were kept, and, as illustrated in (d) of FIG. 7, each inner surface-modified tube was left on the thermostatic pad at 37° C. After each inner surface-modified tube was left for 15 minutes, as illustrated in (e) of FIG. 7, the inner surface-modified tube was inclined to observe blood fluidity. Subsequently, the blood fluidity was observed every five minutes.

The inner surface-modified tubes according to Examples 1 to 3 and Comparative Example 1 in which platelets (clots) were added to the blood after 35 minutes passed after the observation started were rinsed by a PBS (0.01 mol/L for tissue cleaning) solution, immersed in a PBS solution containing 1.5% glutaraldehyde, and stored under refrigeration (at approximately 4° C.). A time at which blood fluidity was lost on each inner surface-modified tube was recorded.

The test was conducted by using two samples (a first sample and a second sample) for each of the inner surface-modified tubes according to Examples 1 to 3 and Comparative Example 1.

[Measurement Result/Test Result]

Results of the measurement and the test are illustrated in the following table 2. Further, FIG. 8 illustrates results obtained by taking photos of states obtained after each first sample of the inner surface-modified tubes according to Examples 1 to 3 and Comparative Example 1 was tested.

TABLE 2

| | Test result | | | | |
|---|---|---|---|---|---|
| | Ra (nm) | Uneven distribution amount | Blood coagulation time (min) First sample | Blood coagulation time (min) Second sample | Blood coagulation time (min) Average |
| Example 1 | 5,400 | 1/10,000 | 40 | 40 | 40 |
| Example 2 | 5,300 | 1/10,000 | 55 | 55 | 55 |
| Example 3 | 5,300 | 1/10,000 | 45 | 45 | 45 |
| Comparative Example 1 | 5,300 | — | 40 | 40 | 40 |

It was found that, as illustrated in Table 2, an inner surface-modified tube in which a functional substance is adsorbed to fine particles has an antithrombogenic function as in Examples 2 and 3.

The preferred embodiments of the present invention have been described above with reference to the drawings. However, the present invention is not limited to the above embodiments. That is, it is understood that other embodiments and various modified examples which one of ordinary skill can conceive within a scope of the invention recited in the claims belong to the technical scope of the present invention.

REFERENCE SIGNS LIST

10 INNER SURFACE-MODIFIED TUBE MANUFACTURING DEVICE
11 DIE
12 FINE PARTICLE SUPPLY PORT
13 FINE PARTICLE SPRAY NOZZLE
100 INNER SURFACE-MODIFIED TUBE
110 TUBE
111 (TUBE) INNER SURFACE
120, 220 FINE PARTICLE
230 FUNCTIONAL SUBSTANCE

The invention claimed is:

1. An inner surface-modified tube, comprising a tube and fine particles, wherein
  the fine particles are buried in an inner surface of the tube with part of surfaces of the fine particles exposed,
  the fine particles are unevenly distributed such that more fine particles are distributed in a region from a center of the tube to the inner surface of the tube than in a region from the center of the tube to an outer surface of the tube based on a thickness direction of the tube,
  an arithmetic average roughness $R_a$ of the inner surface of the tube is 1 nm or more and 100 μm or less,
  a particle diameter of each fine particle is 10 nm or more and 100 μm or less,
  an inner diameter of the tube is 0.01 mm or more and 100 mm or less,
  a ratio of a thickness $L_B$ to a thickness $L_T$ is 1/1,000,000 or more and 1/4 or less, wherein the thickness $L_B$ is an average thickness of buried portions of the fine particles calculated from at least 100 buried portions of the fine particles and the thickness $L_T$ is a thickness of the tube, each fine particle is an inorganic material or a composite material including the inorganic material and another ingredient, and the inorganic material is hydroxyapatite.

2. The inner surface-modified tube according to claim 1, wherein a material constituting the inner surface of the tube is a thermoplastic resin.

3. A method for manufacturing the inner surface-modified tube according to claim 1, the method comprising a burying step of burying the fine particles in the inner surface of the tube with part of the surfaces of the fine particles exposed by spraying the fine particles to the inner surface of the tube, wherein the inner surface of the tube is in a melted or semi-melted state.

4. The method for manufacturing the inner surface-modified tube according to claim 3, the method comprising, subsequently to the burying step, an adsorbing step of causing a functional substance to be adsorbed to the surfaces of the fine particles.

5. An inner surface-modified tube, comprising a tube and fine particles, wherein the fine particles are buried in an inner surface of the tube with part of surfaces of the fine particles exposed, the fine particles are unevenly distributed such that more fine particles are distributed in a region from a center of the tube to the inner surface of the tube than in a region from the center of the tube to an outer surface of the tube based on a thickness direction of the tube, an arithmetic average roughness $R_a$ of the inner surface of the tube is 1 nm or more and 100 μm or less, a particle diameter of each fine particle is 10 nm or more and 100 μm or less, an inner diameter of the tube is 0.01 mm or more and 100 mm or less, and a ratio of a thickness $L_B$ to a thickness $L_T$ is $1/1,000,000$ or more and $1/4$ or less, wherein the thickness $L_B$ is an average thickness of buried portions of the fine particles calculated from at least 100 buried portions of the fine particles and the thickness $L_T$ is a thickness of the tube, the surfaces of the fine particles have a functional substance adsorbed thereon, and the functional substance is heparin, warfarin, ethylenediaminetetraacetic acid (EDTA), citric acid or 2-methacryloyloxyethyl phosphorylcholine (MPC) polymer.

6. The inner surface-modified tube according to claim 5, wherein a material constituting each fine particle is a material which does not covalently bond or ionically bond to a material constituting the inner surface of the tube.

7. The inner surface-modified tube according to claim 5, wherein each fine particle is an inorganic material or a composite material including the inorganic material and another ingredient.

8. The inner surface-modified tube according to claim 7, wherein the inorganic material is hydroxyapatite.

9. The inner surface-modified tube according to claim 5, wherein each fine particle is a photocatalytically active material.

10. The inner surface-modified tube according to claim 9, wherein the photocatalytically active material is titanium oxide.

11. The inner surface-modified tube according to claim 5, wherein a material constituting the inner surface of the tube is a thermoplastic resin.

* * * * *